United States Patent [19]

Griffin

[11] Patent Number: 4,501,496
[45] Date of Patent: Feb. 26, 1985

[54] SPECIMEN SLIDE FOR ANALYSIS OF LIQUID SPECIMENS

[76] Inventor: Gladys B. Griffin, 848 S. Johnson Ct., Lakewood, Colo. 80226

[21] Appl. No.: 376,252

[22] Filed: May 7, 1982

[51] Int. Cl.³ ............................................. G01N 21/01
[52] U.S. Cl. ..................................... 356/246; 350/536
[58] Field of Search ..................... 350/534, 535, 536; 356/244, 246

[56] References Cited

U.S. PATENT DOCUMENTS

| | | | |
|---|---|---|---|
| 2,039,219 | 4/1936 | Hausser et al. | 88/40 |
| 3,565,537 | 2/1971 | Fielding | 356/246 |
| 3,777,283 | 12/1973 | Elkins | 331/94.5 |
| 3,961,346 | 6/1976 | White | 350/536 X |

Primary Examiner—Davis L. Willis
Assistant Examiner—Matthew W. Koren
Attorney, Agent, or Firm—John E. Reilly

[57] ABSTRACT

A transparent specimen slide is made up of a series of isolated specimen viewing surfaces, each surrounded by a channel or groove and a shallow well communicates with each channel and with a notched portion which projects into the viewing surface from the channel opposite to the well of each channel. Pads are formed at spaced intervals along the top surface of the slide together with locating ribs in order to properly position a cover slip in predetermined spaced relation to the viewing surface portions so that when a liquid specimen is deposited in each well it is free to flow by capillary attraction uniformly over the viewing surface portion.

18 Claims, 4 Drawing Figures

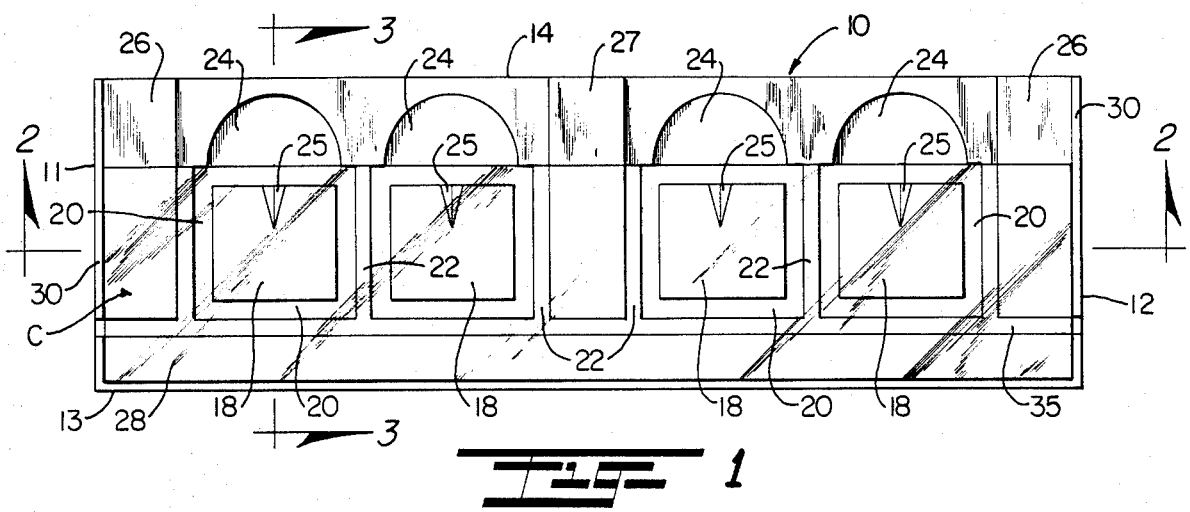
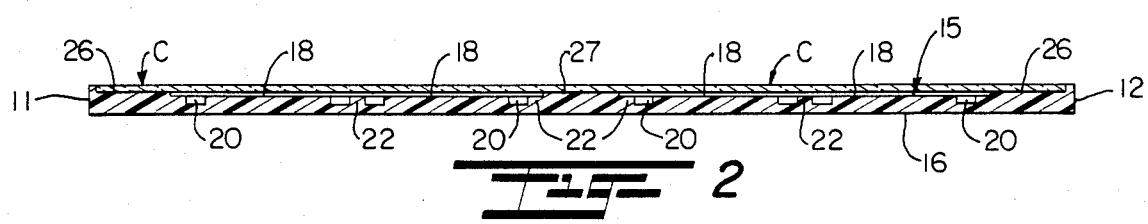
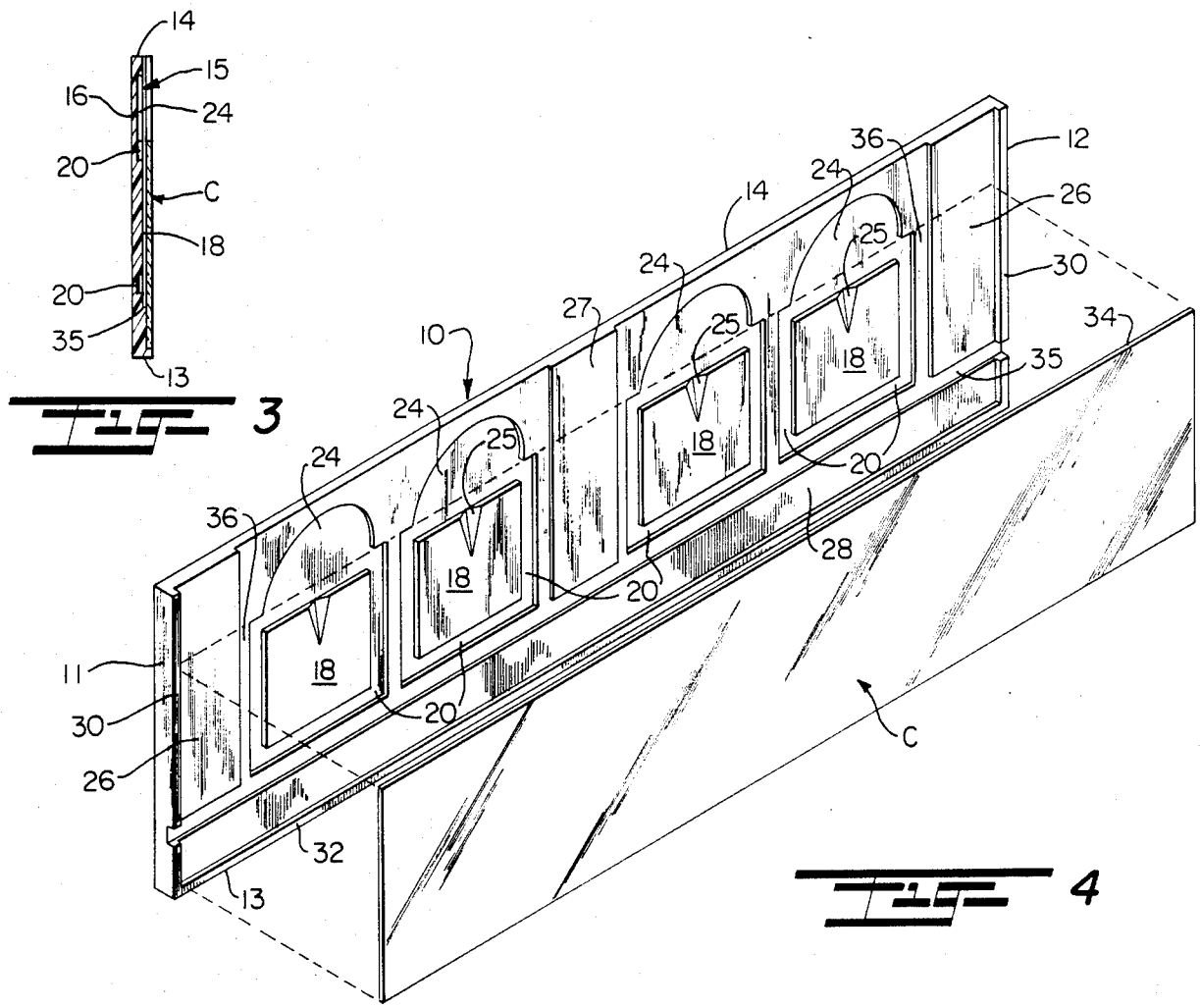

SPECIMEN SLIDE FOR ANALYSIS OF LIQUID SPECIMENS

SPECIFICATION

This invention relates to devices for the examination of liquid specimens; and more particularly relates to a novel and improved specimen slide adapted to receive and retain samples of blood, urine and the like for observation and evaluation using a microscope or other optical instrument.

BACKGROUND AND FIELD OF INVENTION

In the field of medicine and biological sciences, it is desirable to perform qualitative analysis of certain substances with speed and accuracy. When the subject specimen is a liquid, such as, blood or urine, examination is often undertaken by isolating and fixing a small amount of the substance on a transparent plate for viewing through a lighted optical instrument, such as, a microscope. This procedure is especially suited for the observation and evaluation of particulate matter in the specimen; for instance, estimation of sediment in urine or enumeration of red blood cells. Accordingly, it is important that the liquid be spread into a very thin layer of uniform depth.

An early approach to "wet mount" examination of specimens, still very much in use today, involves depositing a drop of the liquid onto a smooth, transparent plate of glass or plastic. A thin cover slip is then placed over the plate to protect and retain the specimen and distribute it as a fairly thin, even film over the viewing area. A disadvantage of this practice is the tendency to introduce too much liquid onto the slide surface, resulting in overflow off the slide surface, displacement of the cover slide, and an uneven or undesirably thick layer of the specimen over the viewing area. Moreover, preparation and handling of the flat slides and fragile cover slips is unnecessarily awkward, often resulting in spillage or runoff and possible contamination of the liquid sample. Finally, each slide can accommodate only one specimen at a time; if comparison between samples is desired, then slides must be prepared and viewed separately, which is time-consuming and necessitates even further handling.

Previous attempts to overcome the foregoing limitations have generally proposed that the slide be provided with an arrangement of channels in communication with a somewhat raised viewing surface. A cover slip is positioned over the viewing area so that liquid placed in the channel will be drawn across the space by the process of capillary action. Representative of this approach is U.S. Pat. No. 2,039,219 to Hausser et al which discloses a haemacytometer having a series of transverse channels and a pair of oppositely inclined surfaces leading to a raised examination area. A cover slide is placed over the raised and channeled areas and a narrow chamber is formed therebetween. The specimen is introduced, as by a dropper, onto one of the inclined portions and is drawn into the chamber; excess liquid remains in the reservoirs formed by the inclined surfaces.

U.S. Pat. No. 3,565,537 to Fielding teaches a somewhat similar approach to a blood specimen holder for use with an optical measuring instrument. This arrangement features a pair of translucent plastic plates, one being formed with a shallow recess, which are welded together to form an intermediate channel for receiving the liquid sample by capillary action. The slide may then be examined under an optical instrument specifically designed to measure the color of blood and thereby determine hemoglobin content.

A further example of the art in this field is U.S. Pat. No. 3,777,283 to Elkins which defines a unitary plastic slide adapted to accommodate a plurality of specimens. Each sample is retained by capillary action in an open-sided chamber which is molded to a predetermined area and depth within the body of the slide. Excess liquid remaining in an introduction channel leading to the chamber may be removed by tapping the open or channel side of the slide against absorbent toweling or the like. Further, as the specimen chamber is formed integrally with the slide, this arrangement does not employ a cover slip.

SUMMARY OF THE INVENTION

It is therefore an object of the present invention to provide for a novel and improved transparent slide arrangement suitable for examining liquid specimens, such as, blood and urine in a reliable and efficient manner.

Another object of the present invention is to provide for a novel and improved liquid specimen slide arrangement in which a liquid specimen is drawn uniformly across a viewing surface in such a way as to present a good representative sample for purposes of examination and qualitative analysis.

It is a further object of the present invention to provide for a novel and improved liquid specimen slide which is so constructed and arranged as to encourage uniform flow of a liquid across a viewing surface and removal of excess liquid which may flow over the edges of the viewing surface thereby preventing displacement of a cover slip or leakage of the specimen into adjacent viewing areas.

Yet another object of the present invention is to provide for a novel and improved transparent slide arrangement having a plurality of viewing areas formed thereon, for example, to facilitate comparison of different specimens while avoiding contamination and intermixture, to catalog related specimens, or to test specimen reaction to a series of reagents.

Still another object of the present invention is to provide a transparent slide wherein a liquid specimen is rapidly drawn by capillary action into a narrow viewing space, and is distributed within the space in an extremely thin layer of substantially constant depth so as to permit undistorted and accurate examination of the specimen and any particulate matter suspended therein.

A further object of the invention is to provide a specimen slide having novel and improved means to act as a positioning guide and retaining means for a cover slip placed over the specimen viewing areas.

Yet another object of the present invention is to provide a transparent slide arrangement which may be manufactured with relative ease and economy using inexpensive materials, such as, plastics so that the slide may be either discarded after use or sterilized for reuse.

In accordance with the present invention, a specimen slide has been devised for use in combination with a conventional cover plate for the microscopic examination of liquid specimens, such as, blood and urine. The slide is an elongated transparent plate of generally rectangular configuration having opposite ends and sides and is provided with an upper examination surface, at least one open rectangular channel being formed in the examination surface and spaced from the ends and sides of the plate so as to define a flat viewing surface within the channel which is completely isolated from the rest of the examination surface. The cover plate is removably disposed over the viewing surface portion and is sized to leave at least a portion of the channel exposed for introduction of a liquid sample, the spacing between the viewing surface and facing or contiguous surface of the cover plate being such as to permit uniform distribution of a portion of the liquid sample over the viewing surface. Preferably, a series of isolated viewing surfaces are formed in this manner and uniformly spaced along the length of the slide with a channel or groove surrounding and defining each viewing surface, each channel including a shallow well or broadened recess of semi-circular configuration which communicates with each viewing surface through a notch which extends a limited distance from the channel into the viewing surface midway along one side edge of the viewing surface. The examination surface preferably is slightly raised above the viewing surface to establish a predetermined spacing between the cover plate and viewing surfaces, and locating ribs are disposed around outer edges of the slide to facilitate proper positioning of the cover slip with respect to the slide.

The above and other objects, advantages and features of the present invention will become more readily understood and appreciated from a consideration of the following detailed description of a preferred embodiment when taken together with the accompanying drawings in which:

BRIEF DESCRIPTION OF THE DRAWINGS

FIG. 1 is a top plan view of a preferred form of specimen slide in accordance with the present invention;

FIG. 2 is a cross-sectional view taken about lines 2—2 of FIG. 1;

FIG. 3 is a cross-sectional view taken about lines 3—3 of FIG. 1; and

FIG. 4 is a somewhat perspective view of the preferred form of invention.

DETAILED DESCRIPTION OF THE PREFERRED EMBODIMENT

Referring in detail to the drawings, a preferred form of slide 10 is specifically adaptable for use in qualitative analysis of liquid specimens, such as, blood, urine and the like. As illustrated, the slide 10 is in the form of a thin, transparent plate of generally rectangular configuration having opposite ends 11 and 12, opposite sides 13 and 14 and upper and lower spaced parallel surfaces 15 and 16. The upper surface 15 serves as the examination surface and is divided into a series of isolated viewing surface portions 18, each portion 18 being in the form of a flat rectangular platform and each completely surrounded by a rectangular channel 20. Each channel 20 in turn is spaced from an adjacent channel 20 by intermediate flat surface portions 22 in the original plane of the upper examination surface as are the viewing surface portions 18. Moreover, each viewing surface portion 18 and its associated channel 20 are spaced inwardly from the ends and sides 11, 12 and 13, 14, respectively.

It will be seen that the viewing surfaces 18 are spaced along the length of the slide 10 and, as described, are completely isolated from one another so as to define independent areas or portions for the examination of a liquid specimen. In order to receive a liquid specimen for viewing purposes, a well 24 of generally semi-circular configuration is formed as a broadened recess area along one section of each channel adjacent to a side edge 14 but is spaced inwardly therefrom. A beveled notch 25 of generally V-shaped configuration is inset into an outside edge of a viewing surface portion 18 midway therealong so as to be aligned directly opposite to each well and to communicate with its respective well through the channel extending therebetween. The channel and well for each viewing surface are of uniform depth so as to form a continuous conduit for the liquid which is introduced, for example, by a dropper into each well; and, at the same time, serves as a receptacle for any excess liquid deposited in the well and which is not drawn over the viewing surface portion in a manner to be hereinafter described.

In the preferred form, in order to establish a predetermined spacing between the cover slip C and viewing surface portions 18, raised surface portions or pads 26 are disposed for extension across the substantial width of the examination surface at each end thereof together with an intermediate pad 27 which extends transversely between the innermost adjacent viewing surface portions. In addition, a pad 28 which is relatively narrow compared to the pads 26 and 27 extends along one side 13 of the examination surface in spaced relation to the pads 26 and 27. The pads 26 to 28 as described are raised slightly above the original plane of the examination surface, such as, by addition of a film or thin sheet, or by the formation of roughened areas at the sectors designated for the pads and which thickness may be anywhere on the order of up to 0.004". In addition, cover slip C is guided into proper position with respect to the viewing surface portion of the channels by outer locating ribs which in the preferred form include ribs 30 at opposite ends of the examination surface and a rib 32 around the one side edge 13 bordering the outsides of the pads 26 and 28, respectively. As previously noted, pads 26 and 27 terminate short of the pad 28, and as shown the ribs 30 terminate short of the rib 32 so as to define an uninterrupted inner passage 35 when the cover slip is positioned in place over the examination surface. Stated another way, the air passage 35 is defined merely by the original plane of the examination surface and the confronting surface of the cover slip to permit adequate venting or release of air from or within the channels 20 when liquid is deposited. In this respect, it will be seen that limited air space or passages 36 are formed immediately surrounding each of the channels and the forward edge 14 of the slide.

In practice, when a slip is positioned over the slide it is dimensioned to seat snugly within and against the locating ribs 30, 32 while resting on the pads 26 and 28. As shown, it is dimensioned to overlie the viewing surface portions 18 with one outer side 34 partially overlapping the channels or the channel portions in which the wells are formed so as to leave the wells fully exposed for placement of a liquid specimen. Both the slide 10 and cover slip C may be composed of a stiff transparent glass or plastic material having desired characteristics of wettability and for example may be composed of a clear or crystal polystyrene or acrylic material. Typically, for a slide 3" in length, 1" wide four viewing surface portions 18 are spaced along the length of the one side 14. For a slide 0.070" thick, the channels are given a depth on the order of 0.030" as are the wells communicating with the channels. Each viewing surface portion 18 has an area on the order of 0.141 square inches and the channels are 0.090" wide. These dimensions are given more for the purpose of illustration and not limitation, the important consideration being in the ability to isolate the viewing surface portion 18, yet to permit uniform distribution of a liquid specimen by capillary attraction over the viewing surface. It has been found that the notched area aids 25 in the initial movement or migration of the liquid from the well upwardly along the surface of the notch onto the viewing surface portion 18. Thus, it is necessary only to place a thickness or amount of liquid in each well necessary only to partially fill the channel, and the liquid then will be drawn by capillary attraction over the viewing surface portion. It is only on those occasions when the channel should become filled with excess liquid adjacent to the well that the remainder of the channel 20 will provide a ready conduit for removal of the excess as it is slowly drawn onto the viewing surface.

It is therefore to be understood that various modifications and changes may be made in the construction and arrangement of parts comprising the preferred embodiment of the present invention without departing from the spirit and scope of the invention as defined by the accompanying claims and any reasonable equivalents thereof.

I claim:

1. A specimen slide assembly adapted for examination of liquid specimens comprising in combination:
   a slide plate having an upper, substantially flat examination surface, said examination surface including at least one viewing surface portion, a continuous channel disposed in surrounding relation to each said viewing surface portion to isolate each said viewing surface portion from the rest of said examination surface, said channel provided with a broadened recessed area in contact with a side edge of said viewing surface, said broadened recessed area defining a well to receive a liquid specimen;
   a transparent cover plate; and
   locating means disposed at least at one end and along one side of said examination surface of said slide plate operative to support said transparent cover plate in predetermined spaced relation to each said viewing surface portion with a side edge of said cover plate aligned to partially expose a portion of said broadened recessed area.

2. In a specimen slide assembly according to claim 1, said cover plate being spaced on the order of 0.004" above each said viewing surface portion.

3. In a specimen slide assembly according to claim 1, wherein said locating means includes raised surface portions provided with air vent passages extending between each said channel and outer edges of said slide plate.

4. In a specimen slide assembly according to claim 3, said locating means including ribs disposed outwardly of said raised surface portions and being recessed to establish uninterrupted extension of said air passages between said channels and outer edges of said slide plate.

5. In a specimen slide assembly according to claim 1, said slide plate being composed of a transparent glass or plastic material.

6. In a specimen slide assembly according to claim 1, a generally V-shaped notch formed in one side edge of said viewing surface portion adjacent to said well.

7. In a specimen slide assembly according to claim 1, the spacing between said slide plate and cover plate being such that liquid is drawn by capillary action from said well onto said viewing surface portion.

8. In a specimen slide assembly according to claim 1, there being a plurality of viewing surface portions extending in spaced relation across said examining surface, and said locating means disposed at opposite ends and along one side of said examination surface.

9. In a specimen slide assembly according to claim 1, said locating means being spaced to define air passages extending between said channels and outer edges of said slide plate.

10. A specimen slide adapted for use in combination with a cover plate in the microscopic examination of liquid specimens, such as, blood and urine, said specimen slide comprising an elongated transparent plate of generally rectangular configuration having opposite ends and sides and provided with an upper examination surface, a plurality of generally rectangular channels uniformly spaced along the substantial length of said examination surface, said channels being isolated from one another and from said ends and sides of said specimen slide, said channels defining a corresponding plurality of viewing surface portions spaced along the substantial length of said examination surface, said cover plate disposed on said examination surface and being sized to completely cover said viewing surface portion while leaving at least a portion of said channel exposed for introduction of a liquid specimen into said channel, and means supporting said cover plate on said examination surface to establish a predetermined spaced relationship between said cover plate and said viewing surface portions for uniform distribution of said liquid specimen from said channel across each said viewing surface portion.

11. In a specimen slide according to claim 10, one side of each said channel disposed parallel to said sides of said specimen slide including a wider recessed area for the introduction of a liquid specimen into each said channel.

12. In a specimen slide according to claim 11, said wider recessed area including a notched portion intruding into one side of each said viewing surface portion.

13. In a specimen slide according to claim 12, said notched portion being of beveled generally V-shaped configuration.

14. In a specimen slide according to claim 10, said support means for said cover plate including pads raised above said viewing surface portions.

15. In a specimen slide according to claim 14, including locating ribs in surrounding relation to said support means.

16. In a specimen slide according to claim 10, each channel including a shallow wall of generally semi-circular configuration in communication with a portion of said channel which extends parallel through said sides of said specimen slide.

17. In a specimen slide according to claim 10, including air passages extending between said support means and said channels.

18. A specimen slide assembly adapted for examination of liquid specimens comprising in combination:
   a slide plate having an upper, substantially flat examination surface, said examination surface including at least one viewing surface portion, a continuous channel disposed in surrounding relation to said viewing surface portion to isolate said viewing surface portion from the rest of said examination surface, said channel provided with a broadened recessed area in contact with a side edge of said viewing surface portion, said broadened recessed area defining a well to receive a liquid specimen and including a notched portion intruding into one side of said viewing surface portion;
a transparent cover plate; and
locating means on said examination surface of said slide plate operative to support said transparent cover plate in predetermined spaced relation to said viewing surface portion with a side edge of said cover plate aligned to partially expose a portion of said broadened recessed area.

* * * * *